United States Patent [19]

Doherty, Jr. et al.

[11] 4,025,042

[45] May 24, 1977

[54] THERMALLY ACTUATED VALVE

[75] Inventors: John Doherty, Jr., Assonet; Youn H. Ting, Attleboro, both of Mass.

[73] Assignee: Texas Instruments Incorporated, Dallas, Tex.

[22] Filed: Sept. 22, 1975

[21] Appl. No.: 615,316

Related U.S. Application Data

[63] Continuation of Ser. No. 428,595, Dec. 26, 1973, abandoned.

[52] U.S. Cl. .......................... 236/101 C; 236/87; 123/117 A; 123/117 A
[51] Int. Cl.² ........................................ G05D 23/02
[58] Field of Search ............ 236/101 C, 81, 101 E, 236/87, 48 R; 337/343; 251/75; 137/468

[56] References Cited

UNITED STATES PATENTS

| | | | |
|---|---|---|---|
| 2,978,879 | 4/1961 | Heidorn | 337/343 |
| 3,361,347 | 1/1968 | Reichel et al. | 236/48 |
| 3,506,194 | 4/1970 | Resseguie | 236/87 |
| 3,734,403 | 5/1973 | Eshelman et al. | 236/87 |
| 3,790,077 | 2/1974 | Wisyanski et al. | 236/87 |
| 3,804,326 | 4/1974 | McIntire | 236/87 |

FOREIGN PATENTS OR APPLICATIONS

| | | | |
|---|---|---|---|
| 1,091,022 | 10/1953 | France | 236/48 |

*Primary Examiner*—John J. Camby
*Assistant Examiner*—Henry C. Yuen
*Attorney, Agent, or Firm*—John A. Haug; James P. McAndrew

[57] ABSTRACT

A thermally actuated valve assembly comprising a housing having a passage extending therethrough with the passage having an inlet, an outlet and a valve seat therebetween. A thermostatic dish-shaped bimetallic disk constituting a valve member is positioned in the passage and is abruptly movable over center from a first curvature position in which the outer periphery of the disk is in engagement with the valve seat thereby to block communication through the passage and a second curvature position in which the disk is clear of the valve seat to permit the flow of fluid therepast. The disk is movable from its first to its second curvature position upon being subjected to a first temperature and is returnable from its second to its first curvature position upon being subjected to a second temperature. A spring member biases the disk toward the valve seat and holds the disk in sealing engagement therewith when the disk is in its first curvature position. The housing includes an abutment engageable by the center portion of the disk as the disk moves over center from its first to its second curvature position thereby to insure that the periphery of the disk moves clear of the valve seat.

4 Claims, 2 Drawing Figures

THERMALLY ACTUATED VALVE

This is a continuation of application Ser. No. 428,595, filed Dec. 26, 1973, now abandoned.

BACKGROUND OF THE INVENTION

This invention relates to a thermally actuated valve assembly and more particularly to a thermal actuated dump valve useful in a coffee maker or other appliance for dumping water heated to a predetermined temperature in a first chamber into or through a second chamber, such as a coffee brewing chamber or the like.

SUMMARY OF THE INVENTION

Among the several objects of this invention may be noted the provision of a thermally actuated valve assembly adapted to snap open at a desired temperature to permit a relatively high rate of flow of liquid therethrough; the provision of such a valve which may readily be installed as a unit in an appliance: the provision of such a valve which substantially avoids leakage when closed: the provision of such a valve in which its valve seat is free of excessive strain when its respective valve member is in engagement therewith to prevent deleterious deformation of the valve seat; the provision of such a valve of sanitary construction for use with food, notable liquids and the like: and the provision of such a valve which may be readily manufactured at low cost and which is reliable in operation. Other objects and features of this invention will be in part apparent in part pointed out hereinafter.

Briefly, a thermally actuated valve assembly of this invention comprises a housing having a passage extending therethrough with an inlet and an outlet therein and a valve seat between the inlet and the outlet. A thermostatic dish-shaped bimetallic disk constituting a valve member is positioned in the passage and is abruptly movable over center from a first curvature position in which the outer periphery of the disk is in engagement with the valve seat thereby to block communication through the passage and a second curvature position in which the disk is clear of the valve seat to permit the flow of fluid therepast. The disk is movable from its first to its second curvature position upon being subjected to a first temperature and is returnable from its second to its first curvature position upon being subjected to a second temperature. A spring member biases the disk toward the valve seat and holds the disk in sealing engagement therewith when the disk is in its first curvature position. The housing includes an abutment engageable by the center portion of the disk as the disk moves over center from its first to its second curvature position thereby to insure that the periphery of the disk moves clear of the valve seat.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
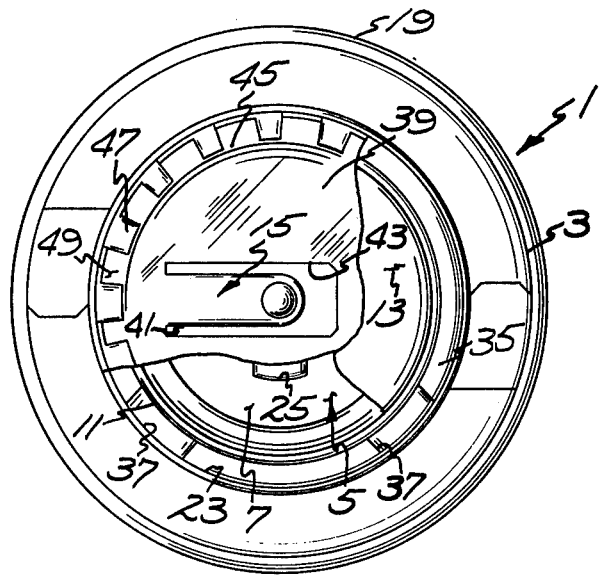
FIG. 1 is a plan of a thermally actuated dump valve of this invention with some parts broken away for clarity.

Referring now to the drawings, a thermally actuated dump valve assembly of this invention is indicated in its entirety at 1 and is shown to comprise a housing 3 of a suitable molded material, such as a thermosetting synthetic resin material. The housing has a passage 5 therethrough with an inlet, as indicated at 7, an outlet 9, and an O-ring 11 constituting a valve seat therebetween. O-ring 11 may be a resilient flexible natural or synthetic elastomer. Alternatively the valve seal could be formed by post cured resilient material flowed in situ. A dish-shaped bimetallic thermostatic valve member or disk 13 is positioned in passage 5. This disk is automatically abruptly movable over center (i.e., it snaps over center) at a first preestablished temperature from a first curvature position (see FIG. 2 solid line position) in which the disk is bowed toward O-ring 11 and the outer margin of the concave face of the disk (as viewed in FIG. 2) is in sealing engagement with O-ring 11 to a second curvature position (see FIG. 2 broken line position) in which the disk is bowed away from O-ring 11 and the margin of the disk is clear of the O-ring thereby to permit the flow of liquid through passage 5. The disk is automatically reversibly movable from its second curvature position to its first curvature position to close the dump valve upon being subjected to a second preestablished temperature.

Dump valve 1 further includes a resilient spring member, generally indicated at 15, biasing valve disk 13 as a unit toward O-ring 11. This biasing means holds the disk in positive sealing engagement with the O-ring when the valve disk is in its first or closed position. It will be understood that the biasing means exerts a force sufficient to maintain sealing engagement of the disk with the O-ring, but does not permit the application of excessive forces to the O-ring which could cause a compression set of the elastomer so as to permanently deform the O-ring and thus cause leakage. Housing 3 includes an abutment 17 engageable by the center portion of valve disk 13 as the disk snaps over center from its open to its closed position so as to prevent movement of the central portion of the valve disk beyond the plane of the periphery of the valve disk when the latter is in its closed position and thus causes the periphery of the valve disk to move clear of O-ring 11 to permit the flow of liquid therethrough.

More particularly, housing 3 is generally circular in cross section and has a relatively large diameter inlet portion 19 and a relatively small diameter outlet portion 21. The outside of inlet portion 19 is provided with means 22 (e.g., threads, bayonet-type locks, snap rings, or the like) for sealingly securing the dump valve assembly in the opening of the bottom wall of a reservoir, such as the water reservoir of a coffee maker or other appliance. The inlet portion 19 has a generally circular recess 23 therein and outlet portion 21 has an outlet passage 25 therethrough of smaller diameter than recess 23 with a shoulder 27 between the recess and the outlet passage. It will be noted that outlet passage 25 is generally located centrally of O-ring 11 so that with disk 13 in its open position, water flows over the top of the O-ring from the outsides thereof toward the inside of the O-ring for passage through outlet passage 25.

An annular groove 29 is formed in shoulder 27, this groove receiving O-ring 11. An integrally formed spider 31 extends across the inlet end of outlet passage 25 and has a projection 33 extending up above the level of shoulder 27 thereby to constitute abutment means 17. Recess 23 is stepped, as indicated at 35, with this step having notches 37 therein. Disk 13 is of somewhat smaller diameter than the internal cross section of stepped portion 35 of recess 23, and notches 37 permit relatively high flow rates of fluid to pass between the peripheral edge of disk 13 and the walls of recess 23.

Figure 2:
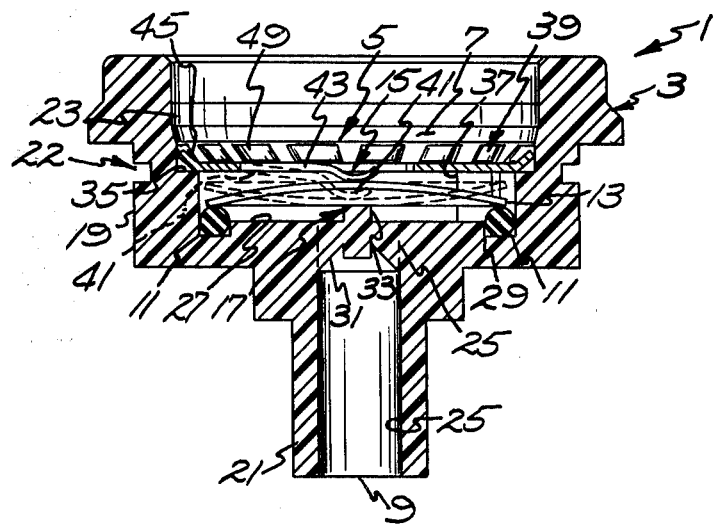
FIG. 2 is a vertical section taken on line 2—2 of FIG. 1 showing in solid lines the valve in its closed position and in broken lines the valve in its open position.

Disk 13 is retained in position relative to O-ring 11 by means of a retainer disk generally indicated at 39. This retainer disk is preferably made of a resilient, flexible material, such as a spring stainless steel or the like. A spring arm 41 is struck from the central portion of the retainer disk, this spring arm being disposed to extend inwardly into recess 23 for resilient engagement with valve disk 13 thereby to resiliently bias the valve disk into engagement with O-ring 11 when the valve disk is in its first or closed curvature position. A slot 43 in retainer disk 39 resulting from arm 41 being struck therefrom serves as an opening in the disk through which water may also flow. Retainer disk 39 is of somewhat larger diameter than recess 23 and consequently coextensively extends over disk 13 to partially shield it from the fluid as shown in FIG. 2. This shielding effect makes the disk response characteristics less critical. The outer margin of disk 39 is bent up, as indicated at 45, and has a plurality of equally spaced slots 47 therearound defining a plurality of spaced tabs 49. Upon forcing the retainer disk into recess 23 until its bottom side engages step 35, the tabs are forced inwardly of the disk and thus forcibly grip the sides of the recess so as to prevent removal of the disk from the recess. It will be understood that slots 47 serve as openings in the disk through which liquid may pass to flow through passage 5.

With dump valve 1 installed in the bottom of a water heating reservoir of a coffee maker or other appliance with water to be heated above (as viewed in FIG. 2) the dump valve and with valve disk 13 in its closed position, the water is maintained in the reservoir until it is heated to a desired temperature range (e.g., 180°–195° F.). Sprng arm 41 biases valve disk 13 into engagement with O-ring 11, and as above described, positively maintains the valve disk in sealing relation with the O-ring, but does not cause compression set of the elastomeric O-ring. Upon the water being heated to the desired temperature, as determined by the temperature at which valve disk 13 snaps over center from its closed to its open position (this temperature also being referred to as a first temperature), the valve disk snaps open (as shown in broken lines in FIG. 2). As the disk snaps from its closed position to its open position, the center portion of the disk moves downwardly and engages or reacts against abutment 17 thereby to prevent further downward movement of the center portion of the disk. This in turn forces the periphery of the disk up clear of O-ring 11 thus opening the valve. With abutment 17 at approximately the level of or somewhat above the top surface of O-ring 11, the abutment insures that, when the disk is in its second curvature position, the peripheral edges of the disk are spaced above O-ring a maximum distance corresponding to the shape of the disk when in its second curvature position thereby to insure a high flow rate (or dumping rate) through the valve. In some applications, it will be understood than an orifice may be provided in passage 5 to restrict the flow therethrough to a specified maximum flow rate.

After the water has been dumped from the reservoir, disk 13 cools below its reset temperature, and the valve disk moves over center from its open to its closed position thereby to close the dump valve. As the valve disk moves over center toward its closed position, spring arm 41 maintains the center of the disk against abutment 17 and thus causes the periphery of the disk to move into engagement with O-ring 11. Upon snapping over center to its first curvature position, the center of the disk lifts free of abutment 17 and the spring arm again maintains the disk seated on O-ring 11.

It will be understood that a valve of this invention may be used for purposes other than dumping water heated to a predetermined temperature, such as in a coffee maker as herein described. For example, the dump valve of this invention may be used in a chilled-water air conditioning system to dump water in the system if the surrounding temperature drops below freezing.

It will be further understood that valves of this invention intended for use with coffee makers and other food preparation appliances are conveniently made of materials which are resistant to deterioration by the fluids to which they are exposed and which are easily maintained in a sanitary condition.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A thermally actuated valve assembly comprising a housing with a recess therein, said housing having a passage therethrough, said passage having an inlet, an outlet and a valve seat between the inlet and outlet, a thermostatic dish-shaped bimetallic disk constituting a valve member adapted to abruptly move over center from a first curvature position in which the outer periphery of said disk is in engagement with said valve seat thereby to block communication through said passage and a second curvature position in which said disk is clear of said valve seat to permit the flow of fluid therethrough, said disk being movable from its first to its second curvature position upon being subjected to a first temperature and being reversibly movable from its second to its first curvature position upon being subjected to a second temperature, a retaining disk having means engageable with the walls of said recess for fixedly securing the retaining disk therein, said retaining disk essentially coextending over said bimetallic disk to partially shield said bimetallic disk and having a resiliently flexible arm engageable with said bimetallic disk biasing said biametallic disk towards said valve seat and holding said bimetallic disk in sealing engagement therewith when said bimetallic disk is in its first curvature position, and abutment means engageable by the center portion of said disk as the disk moves over center from its first to its second curvature position thereby to move the periphery of said clear of the valve seat.

2. A valve assembly as set forth in claim 1 wherein said retaining disk is of a resilient flexible material, such as spring steel or the like, and said arm is struck therefrom to extend toward said bimetallic disk for engagement therewith with a slot in said retaining disk resulting from said arm being struck therefrom constituting an opening for the passage of fluid therethrough said passage.

3. A valve assembly as set forth in claim 2 wherein said retaining disk is of somewhat larger diameter than that of said recess and an outer margin of said retaining disk is upturned, said retaining disk being insertable into said recess with said upturned outer margin thereof facing outwardly of the recess and being engageable with the walls of said recess for securing the retaining disk within said recess.

4. A thermally actuated valve assembly comprising a housing with a recess therein, said housing having a passage therethrough, said passage having an inlet, an outlet and a valve seat between the inlet and outlet, a thermostatic dish-shaped bimetallic disk constituting a valve member adapted to abruptly move over center from a first curvature position in which the outer periphery of said disk is in engagement with said valve seat thereby to block communication through said passage and a second curvature position in which said disk is clear of said valve seat to permit the flow of fluid therethrough, said disk being movable from its first to its second curvature position upon being subjected to a first temperature and being reversibly movable from its second to its first curvature position upon being subjected to a second temperature, a retaining disc of a resilient flexible material, such as spring steel or the like, with a diameter somewhat larger than that of said recess and an outer margin of the retaining disk upturned with radial slots at intervals therearound defining a plurality of spaced tabs with the spaces between the tabs constituting openings so that upon being inserted into said recess with said upturned outer margin facing outwardly of the recess said outer margin tabs engage the walls of said recess for securing the retaining disk within said recess and allowing for the passage of fluid therethrough, said retaining disk essentially coextending over said bimetallic disk to partially shield said bimetallic disc and having a resiliently flexible arm struck from said disc to extend toward said bimetallic disc for engagement therewith to bias said bimetallic disk toward said valve seat and hold said bimetallic disk in sealing engagement therewith when said bimetallic disk is in its first curvature position, said arm creating a slot in said retaining disk resulting from said arm being struck therefrom constituting an opening for the passage of fluid through said passage, and abutment means engageable by the center portion of said disk as the disk moves over center from its first to its second curvature position thereby to move the periphery of said clear of the valve seat.

* * * * *